No. 858,361. PATENTED JULY 2, 1907.
L. J. ALDRIDGE.
AXLE BEARING.
APPLICATION FILED DEC. 19, 1906.
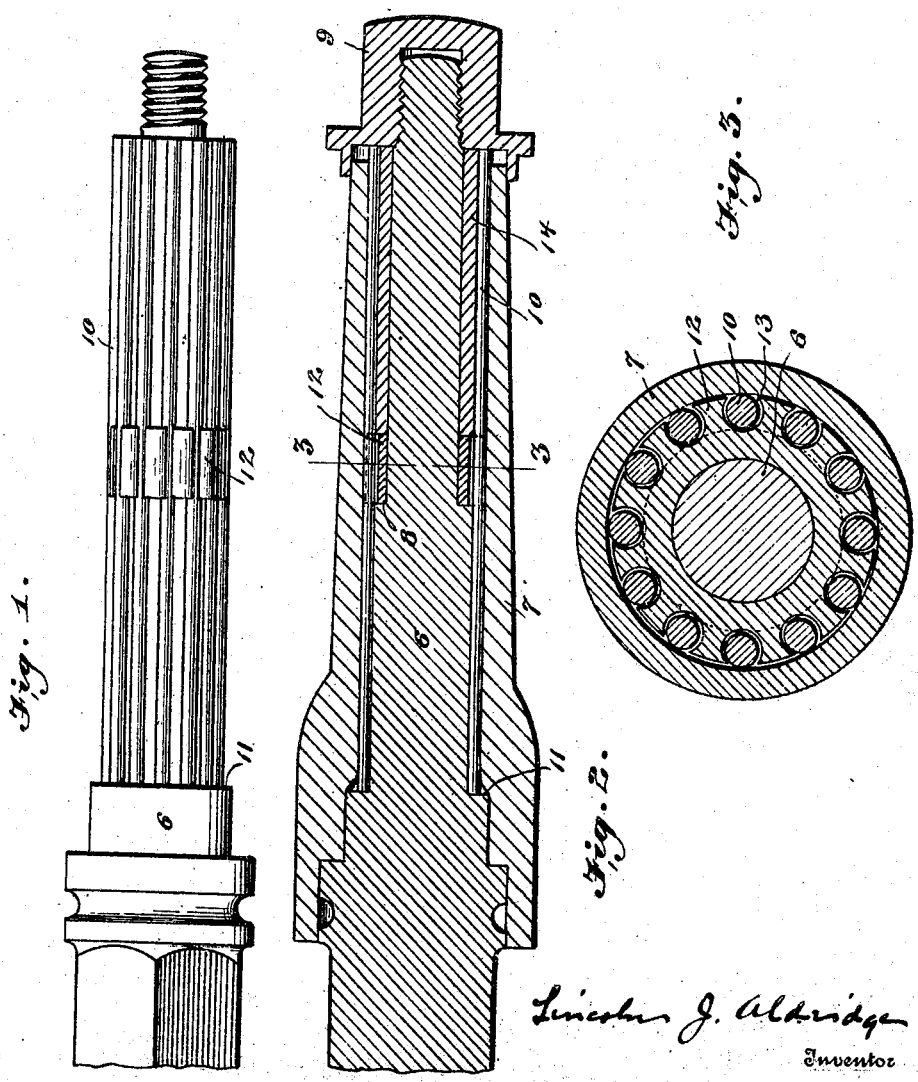

UNITED STATES PATENT OFFICE.

LINCOLN J. ALDRIDGE, OF PLATTSBURG, NEW YORK, ASSIGNOR TO FRANCES L. ALDRIDGE, OF PLATTSBURG, NEW YORK.

AXLE-BEARING.

No. 858,361.  Specification of Letters Patent.  Patented July 2, 1907.

Application filed December 19, 1906. Serial No. 348,611.

*To all whom it may concern:*

Be it known that I, LINCOLN J. ALDRIDGE, a citizen of the United States, residing at Plattsburg, in the county of Clinton and State of New York, have invented certain new and useful Improvements in Axle-Bearings, of which the following is a specification.

This invention relates to roller bearings and is particularly applicable to bearings used on the axles of vehicles, although it is capable of other uses or in connection with other journals as desired.

The object of the invention is to provide improved means for carrying and spacing a series of rollers which are located between the axle and the box, said rollers being carried so that they are held against displacement and retained in proper position.

An especial feature is that the rollers are so held that they will not fall out or off when the box is removed, as in the act of removing the wheel from the axle. This is particularly advantageous in connection with vehicle wheels which have to be frequently removed for oiling or other purposes. The rollers are so held, nevertheless, that they can be readily removed or replaced by being pulled out endwise from the retaining and spacing device.
The invention is illustrated in the accompanying drawings, in which Figure 1 is a side elevation of the bearing, with the box removed. Fig. 2 is a central longitudinal section. Fig. 3 is a cross section on the line 3—3 of Fig. 2.
Referring specifically to the drawings, the axle is indicated at 6 and the box at 7. The former is reduced for about half the length of the bearing, forming a shoulder as at 8, and it is threaded at the end to receive the nut 9 which holds the parts and which also holds the rollers in place lengthwise.

The rollers 10 are of substantially the same length as the bearing and are arranged in a circular series around the axle, being held against lengthwise movement by the shoulder 11 at the heel of the axle and the nut 9 as stated. They are retained and spaced by a ring 12 which fits loosely upon the reduced portion of the axle, against the shoulder 8. The rollers extend through notches 13 in the periphery of the ring. The notches are undercut or comprise more than a half circle, so that when the rollers are inserted therein by endwise movement they are prevented from falling or dropping off sidewise and consequently will stay in place even if the box be removed.

To bring the bearing surface at the outer end of the axle flush with the bearing surface inside the shoulder 8, a sleeve 14 is slipped on the reduced portion of the axle between the nut and the ring 12. The sleeve fits at a snug fit and its thickness is equal to the depth of the shoulder 8, so that a flush bearing surface is formed for both ends of the rollers 10.

The ring 12 is quite loose upon the axle, so that there is little or no friction between the inside of the ring and the surface of the axle. Furthermore, the notches 13 in the ring are of such depth that they extend below the bearing surface of the axle, and consequently the series of rollers rest upon the bearing surface of the axle rather than upon the bottom of the notches. The outer sides of the rollers project beyond the circumference of the ring 12, in contact with the box, so that the rollers are held between the bearing surface of the axle and box, respectively, and are merely retained and spaced by the ring 12.

As stated, the rollers will not drop out when the box is removed, but they may be removed or replaced when desired by taking off the nut and pulling them out sidewise. Or the ring, sleeve and rollers may be removed bodily by slipping them off the axle simultaneously.

The whole apparatus provides a simple and inexpensive arrangement which can be applied to new axles, or even to old ones by turning down the outer portion thereof and applying the ring, sleeve and rollers thereto.

I claim:

1. The combination with a box, and an axle having a reduced portion, of a series of rollers between the box and axle, a spacing ring on the reduced portion of the axle and having notches through which the rollers extend, and a sleeve on the reduced portion of the axle, the surface of the sleeve being flush with the surface of the larger portion of the axle.

2. The combination with an axle having a reduced portion, a sleeve on the axle, with its outer surface flush with that of the larger portion of the axle, a spacing ring on the axle between the end of the sleeve and the end of the larger portion of the axle, a box, and rollers carried by the ring within the box, and bearing at one end on the larger portion of the axle and at the other end on the sleeve.

3. The combination with an axle having a reduced portion about the middle of the journal thereof, a ring fitting in said portion and extending around the axle and having undercut grooves across the periphery thereof, a box, and rollers extending through said grooves and retained therein against lateral removal, and bearing between the box and the axle.

4. The combination with an axle having a reduced portion about the middle of the journal thereof, a ring extending around said portion and having undercut grooves in the periphery thereof, a box, rollers between the box and axle and extending through the grooves and removable endwise therefrom, there being a retaining shoulder extending around the axle at the inner end of the rollers, and a nut on the axle opposite the other end of the rollers and the end of the box.

In testimony whereof I affix my signature, in presence of two witnesses.

LINCOLN J. ALDRIDGE.

Witnesses:
DAVID H. AGNEW,
JOSEPH N. LANDRY.